United States Patent [19]

Gallucci et al.

[11] Patent Number: 5,060,989
[45] Date of Patent: Oct. 29, 1991

[54] PIPE JOINT RETAINING DEVICE WITH LOCKING LEVERS

[75] Inventors: Theodore A. Gallucci, Lindenhurst; Norman R. Doherty, Farmingdale, both of N.Y.

[73] Assignee: Bio-Jet Corporation, Farmingdale, N.Y.

[21] Appl. No.: 514,750

[22] Filed: Apr. 26, 1990

[51] Int. Cl.$^5$ .............................................. F16L 23/04
[52] U.S. Cl. .................................... 285/337; 285/320; 285/81; 403/330
[58] Field of Search .................... 285/81, 87, 305, 308, 285/309, 310, 320, 403; 403/330, 338, 336

[56] References Cited

U.S. PATENT DOCUMENTS

| | | | |
|---|---|---|---|
| 4,092,036 | 5/1978 | Sato | 285/337 |
| 4,848,808 | 7/1989 | Pannell | 285/337 |

Primary Examiner—Randolph A. Reese
Assistant Examiner—Tim Aberle
Attorney, Agent, or Firm—Edward H. Loveman

[57] ABSTRACT

This pipe joint retaining device has a cylindrical ring concentrically and coaxially engaging a first pipe inserted into an open bell at the end of a second pipe axially aligned with the first pipe. The ring has spaced pairs of flanges extending outwardly and each carrying a pivotable locking lever turnable between open and closed positions. At one end of each lever is a locking screw terminating in a sharp edge to dig into the first pipe when the 10 screw is tightened to turn the lever to closed position. Tapered domed plugs are carried by the ring with one plug disposed between the flanges of each pair thereof in a tapered bore thereat. The plug has a sharp edge which pierces the first pipe when the locking screw is tightened to force the lever into closed position. Each lever has an undercut forward section which cantilevers over the open bell; and a holding screw carried by the forward section of the lever contacts the bell to hold it in place on the first pipe. A resilient gasket in the bell contacts an end face of the ring. When the lever is in open position the forward section clears the bell to allow it to be moved axially with respect to the first pipe.

16 Claims, 3 Drawing Sheets

PIPE JOINT RETAINING DEVICE WITH LOCKING LEVERS

BACKGROUND OF THE INVENTION

1. Field of the Invention

This invention relates to the art of pipe coupling devices and more particularly concerns ar improved retaining device for maintaining a sealed joint betwe'en a cylindrical end of one pipe and a bell at the end of another pipe or pipe fitting.

2. Description of the Prior Art

It has been conventional practice heretofore, when a cylindrical end of a first pipe has been inserted into a bell at the end of a second pipe or a fitting, to effect a joint by mounting an annular or ring flange on the first cylindrical pipe. This flange is secured in place on the first pipe by setscrews. The ring flange has circumferentially spaced holes which register with corresponding holes in an annular flange at the free end of the bell of the second pipe. Bolts can be inserted through the registering holes and secured by nuts. In another construction, the holes in the free end of the bell are threaded and the connecting bolts are screwed into the holes in the bell without the use of nuts. The bolt heads abut the ring flange on the first pipe. These prior joint constructions present a number of difficulties and disadvantages. If the bell of the second pipe is warped, the holes in the free end of the bell do not register precisely with the holes in the ring flange on the first pipe. This misalignment makes it difficult to insert the connecting bolts. If one or more holes are enlarged in either flange to insert the connecting bolts, points of weak support for the bolts are caused, which can lead to later failure of the pipe joint. Another disadvantage is the rigidity of the joint. Any severe lateral bending or torsional twisting of the joined pipes with respect to each other causes intense strain on the connecting bolts which often break and failure of the joint then ensues. Another cause of prior joint failure is slippage of the set screws holding the ring; flange on the first pipe. These setscrews must oppose axial strains to which the coupled pipes are subjected. Since the setscrews are often smaller and weaker than the connecting bolts, failure of the joint occurs due to slippage or breakage of the setscrews when severe axially stresses and strains are applied to coaxially connected pipes. A further disadvantage is the time consuming assembly procedure required to insert and tighten the many connecting bolts and nuts in a properly balanced way. A still further objection is the great expense incurred for the large bolts, washers, nuts and other hardware, to secure the pipe joint. Where large pipes are to be installed ranging in size up to forty-eight inches or more, the expense for hardware is quite considerable.

SUMMARY OF THE INVENTION

The present invention has as a principal object to avoid the difficulties and disadvantages encountered with prior conventional pipe joining devices and procedures, and to provide an improved joint retaining device. The new pipe joint retaining device employs a cylindrical retainer ring which may be cast integrally with a first cylindrical pipe or the ring may be mounted coaxially and concentrically thereon. The end of the first cylindrical pipe is inserted into a bell located at the end of a second cylindrical pipe. The bell has an annular flange at its free end. Now according tc the invention, the retainer ring is provided with a plurality of pairs of outwardly extending spaced flanges. The pairs are circumferentially spaced around the ring. The numbers of pairs of flanges will depend on the diameter of the cylindrical pipe inserted into the bell end of the coaxially aligned pipe. Since the pipes may range in outside diameter from about three inches to forty-eight inches or more, the number of pairs of flanges may range from three to twelve or more. Each pair of parallel flanges supports a malleable iron clamping or locking lever pivotable on a pin or stub shaft carried by each pair of flanges. The levers all pivot in diametral axial planes of the retainer ring and coaxial pipe on which it is mounted. Between the flanges in each pair thereof is a tapered bore or hole in which is placed a tapered hardened steel button or plug having a sharp edge pointing inwardly toward the first pipe on which the retainer ring is mounted. This button or plug has a convex top surface which is contacted by an inner facing side or edge of the lever. The lever is turned by means of a leaver locking screw mounted in a threaded bore or hole near one end of the lever. This screw has a concavity at its free end terminating in a hardened circular edge. As the lever locking screw is turned to tighten it against the first pipe, the lever forces the sharp edge of the plug to bite into the side of the malleable first pipe. This pipe is made of malleable iron so that it yields to form a circular pit in which the anchoring edge of the plug seats. The sharp, hardened end edge of the lever locking screw digs into the side of the first pipe forming another pit in which the locking screw seats. The lever locking screw and anchoring plug securely hold the locking lever in place on the first pipe. The locking lever has a forward end section formed with an undercut. This end section cantilevers over the annular flange of the adjacent bell of the second pipe. An adjustment and holding screw is set in the head of the locking lever, and on being tightened, its free end abuts the forward face of the flange on the bell. When all of the adjustment screws are tightened, the bell of the second pipe is locked in place on the first pipe. A resilient O-ring gasket or gland is seated on a shoulder inside the bell and abuts a facing edge of the retainer ring to effect a fluid-tight seal between the bell and coupled first pipe. By this arrangement the coupled first and second pipes can twist and bend to a limited degree with respect to each other without causing failure to the joint. The construction of the retaining device allows for such adjustment to the joint without breaking the hermetic seal between the joined pipes. If a strain occurs tending to separate the joined pipes axially, the anchoring steel plugs, locking screws, and bell holding screws tend to hold the coupled pipes more securely together.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENTS

Figure 1:
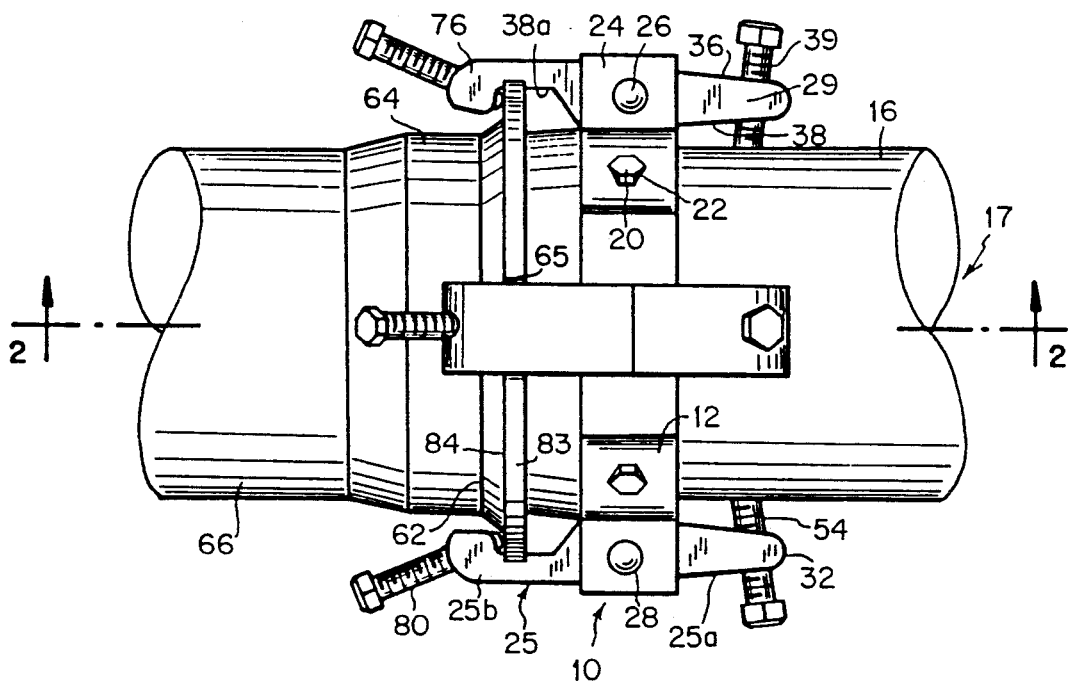
FIG. 1 is a side elevational view of a pipe joint retaining device embodying the invention with locking levers shown in closed and locked position.
Figure 2:
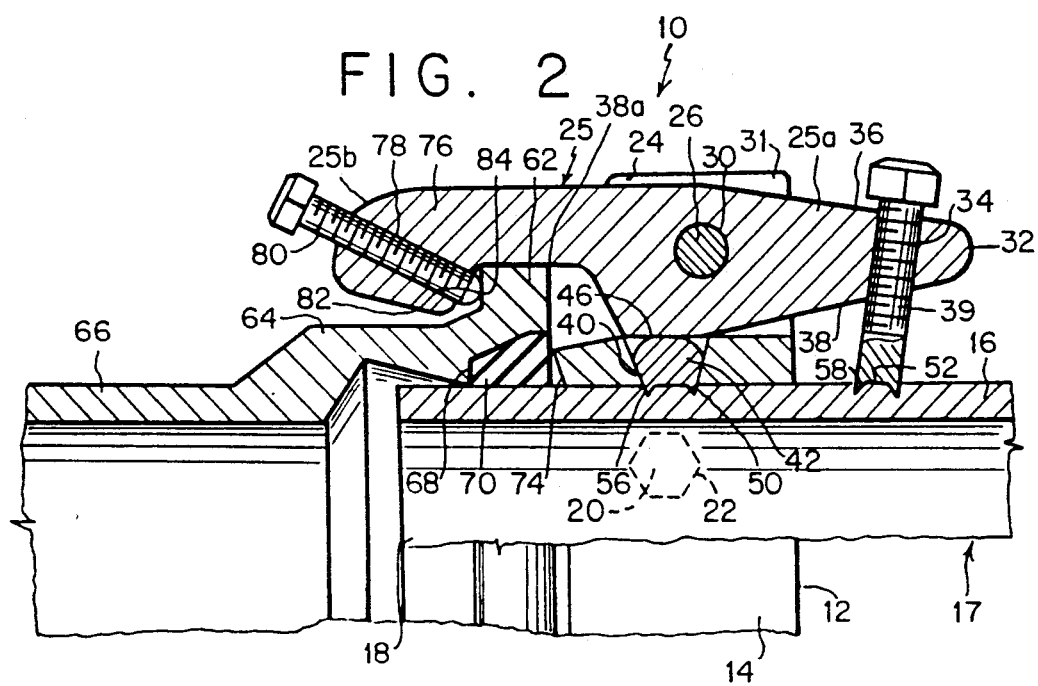
FIG. 2 is an enlarged fragmentary axial sectional view taken along line 2—2 of FIG. 1 showing one locking lever in the closed and locked position.
Figure 3:
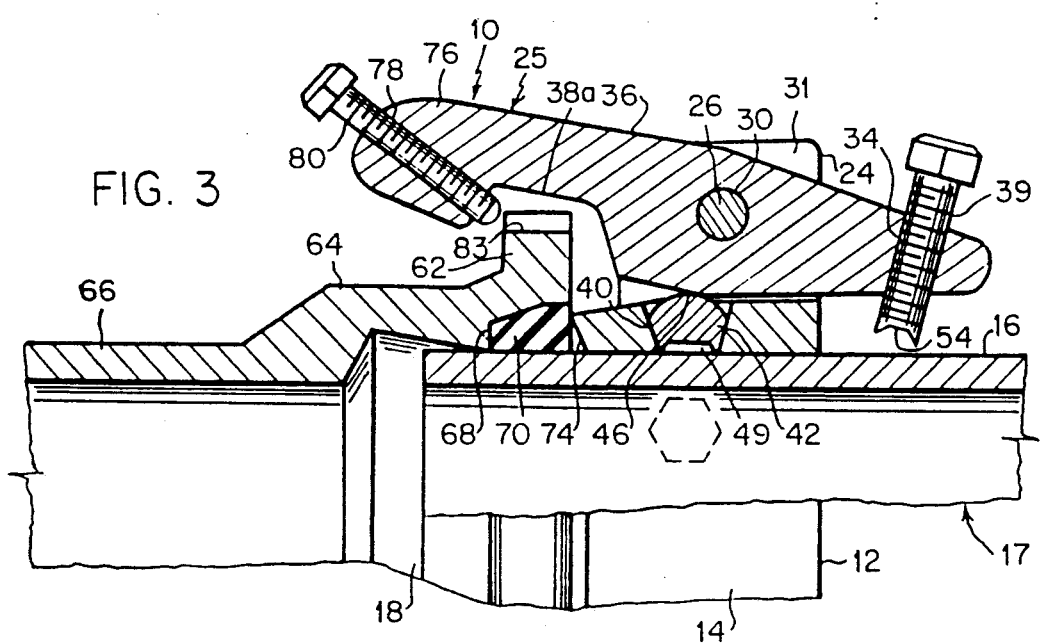
FIG. 3 is a fragmentary sectional view similar to FIG. 2 showing the locking lever in open position.
Figure 4:
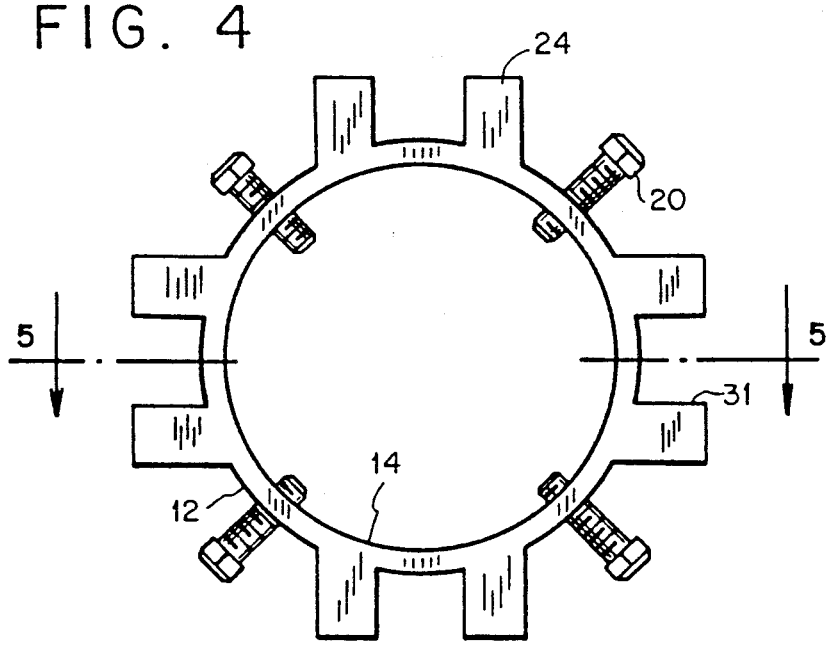
FIG. 4 is an end elevational view of the retainer ring employed in the pipe joint retaining device.
Figure 5:
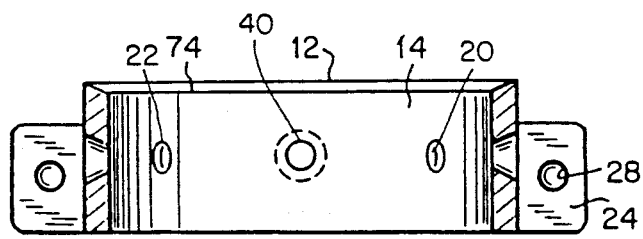
FIG. 5 is a horizontal cross sectional view taken along line 5—5 of FIG. 4.
Figure 6:
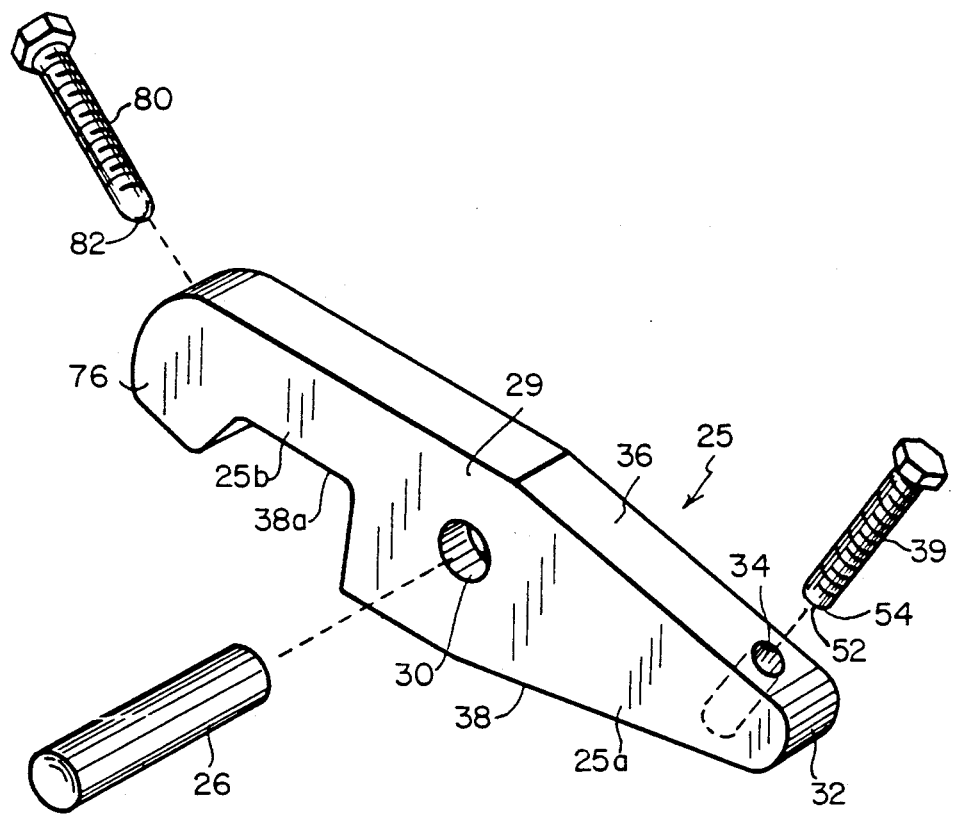
FIG. 6 is an exploded perspective view on an enlarged scale of a locking lever and associated parts.
Figure 7:
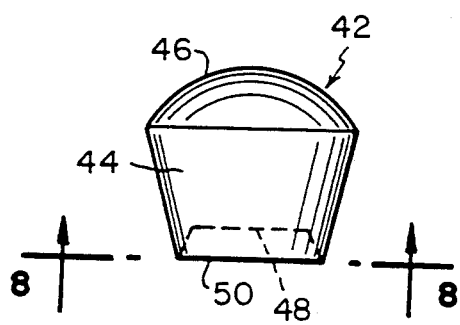
FIG. 7 is an enlarged side elevational view of a tapered locking plug.
Figure 8:
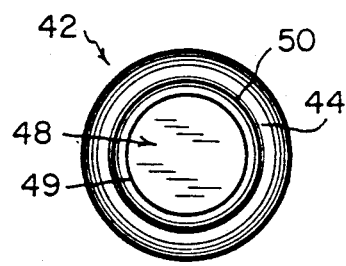
FIG. 8 is a bottom plan view of the locking plug taken along line 8—8 of FIG. 7.

Referring now to the drawings wherein like reference characters designate like or corresponding parts throughout, there is illustrated in FIGS. 1,2 and 3 a pipe joint retaining device generally designated by reference numeral 10 which employs a steel cylindrical flanged retainer ring 12, shown to best advantage in FIGS. 1-5. The ring 12 has a smooth cylindrical inner wall 14 which conforms to an external cylindrical wall 16 of a malleable iron pipe 17 having an axially straight cylindrical end 18. The ring 12 may be cast integrally with the pipe 17 or as illustrated, manufactured as a ring to slide concentrically and coaxially on the pipe 17 and be secured in place by a plurality of circumferentially spaced setscrews 20 each engaged in a respective threaded radial hole 22 in the ring 12; see FIGS. 1,2,3,5. The setscrews 20 bear on and grip the wall 16 of the pipe 17. The screw holes 22 are circumferentially disposed between pairs of flat flanges 24 spaced equally around the ring 12. Each pair of flat, parallel outwardly extending flanges 24 pivotally support thereinbetween a malleable iron locking lever 25 shown to best advantage in FIGS. 1,2 and 3. A pivot pin or stub shaft 26 extends through an axial hole 28 in each of the flanges 24 and a registering hole 30 in each lever 20 25 to serve as a fulcrum for the lever between opposite ends thereof. Each lever 25 has flat sides 29 slidably contacting adjacent inner sides 31 of the flanges 24 so that the flanges 24 guide and hold the levers 25 and prevent them from moving laterally.

Each lever 25 has a tapered rear end section 25a with a rounded end 32. A threaded bore or hole 34 extends through the lever 25 near the end 32 between an upper or outer side 36 and a lower or inner side 38. A lever locking screw 39 is threaded in and extends through the hole 34. Just forwardly of each pivot pin or shaft 26 is a tapered bore or hole 40 formed in the ring 12 between the flanges 24 of each pair thereof in which the lever 25 turns angularly. A tapered plug 42 is inserted in each bore or hole 40. The plug 42, as best shown in FIGS. 2,3,7 and 8 has a conical body 44 formed with a spherically curved, convex dome 46 at the top. A cavity 48 at the bottom defines the inner side 49 of a very sharp, circular, knife edge 50. The plug 42 is made of hardened steel and is intended to bite into the outer wall 16 of the pipe 17 when the lever 25 is turned angularly counterclockwise (FIG. 2). This turning is effected by rotating the screw 39 axially inward to engage the pipe 17. The screw 39 is formed with a concavity 52 at its free end terminating in a sharp circular knife edge 54. The screw 39 is made of hardened steel so that the sharp end 54 digs into the wall 16 of the pipe 17 when the screw 39 is tightened. As the lever 25 turns the bottom or inner side 38 contacts the dome 46 of the plug 42 and forces it to bite into the wall 16 of the pipe 17. The distance from plug 42 to the shaft 26 taken longitudinally of the lever 25 is very much smaller than the lever distance from the shaft 26 to the screw 39. Thus the screw 39 causes the lever 25 to exert a very high pressure on the plug 42. When the plug 42 is fully seated as shown in FIG. 2, it forms a circular bite mark or pit 56 in the wall 16 of the pipe 17, and the plug body 44 is snugly received and held in the tapered hole 40 in the ring 12. At the same time the sharp end of the screw 39 forms a circular bite mark or pit 58 spaced rearwardly of the pit 56. Thus, in the closed position of the lever 25, shown in FIGS. 1 and 2 the entire joint retaining device 10 is locked in place on the pipe 17. The lever 25 extends longitudinally in an axial diametral plane of the ring 12 and the pipe 17.

The front end section 25b extending forwardly of the shaft 26 has a bottom or inner undercut portion 38a of the inner side 38 of the lever 25. The undercut portion 38a extends over an annular flange 62 at the wider free end of a bell 64 located at the forward end of another cylindrical pipe 66 made of malleable iron. The flange 62 has a plurality of notches or cutout portions 63 which are somewhat wider than the width of the lever 25 to loosly accomodate each of the levers 25 therein. The bell 64 has an inner annular shoulder 68 in which is seated a resilient 0-ring gasket or gland 70. The rear face of the 0-ring 70 contacts a forward inclined annular face 74 of the ring 12, when the bell 64 is fully engaged with the free end 18 of the pipe 17.

The front section 25b of the lever 25 terminates in a rounded head 76. A threaded hole or bore 78 is formed in the forward end of the lever 25. The bore 78 extends axially in an inclined direction with respect to the axis of the bell 64. A bell holding screw 80 is engaged in the bore 78 and has a rounded end 82 which engages a forward face 84 of the flange 62. When the lever 25 is turned fully counterclockwise as viewed in FIG. 2, the head end 76 of the lever 25 is positioned forwardly of the bell face 84 so that the screw 80 can contact and hold the bell 64 in place. The cooperative action of all of the holding screws 80 effectively keeps the joint between bell 64 and pipe 17 closed and hermetically sealed. It will be noted that no bolts are engaged in holes in the flange 62 as has been the prior conventional practice. Thus all the difficulties and disadvantages of the prior construction as pointed out above, are avoided.

FIG. 3 shows a step in the procedure for assembling the pipe joint. First, the ring 12 carrying the plug 42 and the lever 25 is mounted axially on the pipe 17. Then the pipe end 18 is inserted into the open end of the bell 64. The setscrews 20 are then tightened to set the ring 12 securely in place on the pipe 17. All of the levers 25 are turned to the open position, i.e. extreme clockwise position of rotation indicated in FIG. 3. It will be noted that the head end 76 of the lever 25 is spaced radially outward far enough to clear the bottom of the notch 63 of the flange 62. The plug 42 rests lightly on the outside 16 of the pipe 17. The screws 80 and 39 are turned to retracted positions in the respective bores or holes 78 and 34. The joint retaining device 10 is now in proper position to begin closing the levers 25. This is accomplished by turning screws 39 to maximum extent axially inward, where the lever 25 is turned fully counterclockwise as shown in FIG. 2. Then the sharp edge 54 of the screw 39 bites into the pipe wall 16. At the same time the inner edge 38 of the lever 25 is applied to the dome 46 of the plug 42 to force the plug 42 axially inward of the bore 40 so that the sharp circular edge or tooth 50 bites into the pipe wall 16 to form the pit 56 where the plug 42 is effectively locked and cannot move axially of the pipe 17. The screw 39 and the plug 42 cooperate with the setscrews 20 in holding the ring 12 securely in place on the pipe 17. As the screw 39 is tightened against the pipe 17, and the lever 25 turns counterclockwise to the closed position, the head end 76 of the lever 25 moves radially inward of the bell 64 to position the end 82 of the screw 80 radially inward of the outer edge 83 of the flange 62. By turning the screw 80, its rounded end 82 bears against the forward side 84 of the flange 62 to lock the bell 64 in coaxial alignment with the pipe 17. A hermetically sealed joint is effected even if the bell 64 and the flange 62 are warped becaause the screws 80 will advance until they make contact with the end face 84 of the flange 62. Also the ring gasket 70 allows for limited torsion, twisting, bending, and warpage of the bell 64. If axial strains occur in the joint tending to separate the pipe 17 and the bell 64, the screws 39 and 80 will hold the parts even more securely in cooperation with the embedded plugs 42 and the setscrews 20. The inclined axial positions of the screws 39 and 80 enable them to oppose any tendency to separate the pipe 17 and the bell 64.

The retainer ring 12 of the joint retaining device 10 is shown in the drawings provided with four sets or pairs of flanges 24 and four pivotable locking levers 25. It will be understood that the number of flange pairs and the number of locking levers provided will depend on the specified sizes of the pipes to be joined. These sizes may range from about three inches in diameter to more than forty-eight inches, and the number of pairs of flanges 24 and locking levers 25 may range from three for the smallest size pipe to twelve or more for the largest coupled pipes.

It should also be understood that if desired the plug 42 may be manufactured integrally with the arm 25. Clearly the tooth 50 and the knife edge 54 may be shaped as a needle or any other form which would bite into the wall 17 of the pipe 16. Similarly, if desired, the rounded or ball shaped end 82 of the screw 80 may be shaped as the knife edge 54 of the tooth 50 or as a needle or other form which would bite into the flange 62, but in this event some of the flexibility of this new joint would be lost.

This invention is characterized by the security of the joint between the pipes. The setscrews 20 which hold the ring 12 in position on pipe 17 assist levers 25, plugs 42 and screws 39 and screws 808 in holding the joint securely. This contrasts with prior pipe joints where small setscrews bear on one cylindrical pipe and sustain the major load of strains between the coupled pipes. Moreover, if desired, the setscrews may be eliminated by casting the retaining ring 12 with the pipe 17, as hereinbefore stated. Also in the present invention, prior or subsequent distortion of the bell 64 does not affect tightness or security of the joint. The screws 80 can easily be tightened to take up and adjust for any slack which may occur. As pointed out above the holding power of the retaining device actually increases when axial strains occur tending to separate the pipes 17 and 66. In prior pipe joints by contrast, distortion of the bell ends of the coupled pipes almost invariably caused the coupling joints to fail. This invention is further characterized by ease of assembly. No special tools or special skills are required to mount and secure the retaining device 10 in position. The new retaining device 10 effects economy in the use of bolts and screws. The great expense incurred for massive nuts and bolts heretofore used in prior pipe coupling devices is largely avoided. Disassembly is also facilitated if required. The screws 39 and 80 can easily be loosened when necessary or shafts 26 can be knocked axially out from flanges 24. This contrasts with prior joint devices, where the large holding 30 bolts and nuts often freeze in position and cannot be loosened without damaging or destroying the pipe bell to separate it from the coupled pipe.

It should be understood that the foregoing relates to only a preferred embodiment of the invention which has been by way of example only, and that it is intended to cover all changes and modifications of the example of the invention herein chosen for the purposes of the disclosure, which do not constitute departures from the spirit and scope of the invention.

What is claimed is:

1. A pipe joint retaining device for coupling a first cylindrical malleable pipe to an open bell end of a second cylindrical pipe axially aligned with said first pipe, comprising:
   a cylindrical retainer ring concentrically on and coaxially with said first cylindrical pipe and adjacent to said open bell of said second pipe;
   a plurality of pairs of flanges spaced circumferentially apart around said ring and extending outwardly thereof, said flanges in each pair thereof being spaced apart circumferentially of said ring;
   a plurality of locking levers each respectively pivotably carried by one of said pairs of flanges and turnable between an open and a closed position with respect to said ring and said first pipe;
   pivot means supporting each of said levers to turn the same angularly at a fulcrum intermediate cpposite ends of said lever to turn the same angularly in an axial, diametral plane of said ring;
   a plurality of puncture means, one of which is located under each of said locking levers, each of said puncture means having a sharp edge portion facing axially inward of said ring to contact said first pipe;
   locking means located rearwardly of said pivot means and at a rear end of each of said levers and extending therethrough for engaging said first pipe while said lever forces said puncture means to pierce said first pipe, to lock thereto; and
   holding means located forwardly of said puncture means and at a forward end of each of said levers and extending therethrough for engaging said bell of said second pipe and holding the same in coaxial alignment with said ring and said first pipe when said lever is turned to said closed position.

2. A pipe joint retaining device as claimed in claim 1, further including attachment means for securing said retainer ring on said first pipe.

3. A pipe joint retaining device as claimed in claim 1, wherein said retainer ring is cast integrally with said first pipe.

4. A pipe joint retaining device as claimed in claim 1, wherein said locking means has a sharp end to dig into said first pipe at a point spaced rearwardly from said puncture means to cooperate therewith in locking to said first pipe.

5. A pipe joint retaining device as claimed in claim 4, wherein said ring has a plurality of tapered bores each located between a pair of said flanges, and wherein each of said puncture means comprises a plug having a tapered body seated in one of said tapered bores in said ring to remain locked therein when said lever is turned to a closed position to force said plug to bite into said first pipe.

6. A pipe joint retaining device as claimed in claim 1, wherein each of said levers has a forward section extending forwardly of said ring to cantilever over an open rear end of said bell and wherein said holding means comprises a screw mating with threads in said forward end of said lever, said screw extending through said lever to engage said rear end of said bell.

7. A pipe joint retaining device as claimed in claim 6, further comprising a resilient O-ring gasket set in said bell and axially abutted to said ring when said holding screws are tightened while said lever is in said closed position, to effect a hermetic seal between said bell and said first pipe.

8. A pipe joint retaining device as claimed in claim 2, wherein said attachment means for said ring comprises setscrews to engage said first pipe and to cooperate with said locking means and said puncture means in holding said ring in place on said first pipe.

9. A pipe joint retaining device as defined in claim 1, wherein each of said levers has flat opposite sides, and wherein said flanges in each pair thereof are disposed parallel to each other and spaced apart a distance equal to the width of said lever disposed therebetween, to hold said lever and to guide the same in angular rotation in said diametral plane between said open and said closed positions thereof.

10. A joint retaining device as claimed in claim 1, wherein each of said levers has a first hole located between said pair of flanges, and wherein each of said flanges in said pair thereof has a second hole registering with said first hole in said lever, and wherein said pivot means comprises a stub shaft extending axially through said registering first and second holes to serve as an axis of rotation and fulcrum for said lever disposed thereat.

11. A joint retaining device as defined in claim 5, wherein each of said plugs has a convex top opposite from said sharp edge portion disposed for engagement by said lever thereat when moving between said open and closed positions thereof.

12. A joint retaining device as claimed in claim 6, wherein each of said forward sections of said levers is shaped to clear said bell when said lever thereat is turned to said open position in said diametral plane of said ring.

13. A pipe joint retaining device as claimed in claim 3, wherein said locking means has a sharp end to dig into said first pipe at a point spaced rearwardly from said puncture means to cooperate therewith in locking to said first pipe.

14. A pipe joint retaining device as claimed in claim 13, wherein said ring has a plurality of tapered bores each located between a pair of said flanges, and wherein each of said puncture means comprises a plug having a tapered body seated in one of said tapered bores in said ring to remain locked therein when said lever is turned to a closed position to force said plug to bite into said first pipe.

15. A pipe joint retaining device as claimed in claim 14, wherein each of said levers has a forward section extending forwardly of said ring to cantilever over an open rear end of said bell and wherein said holding means comprises a screw mating with threads in said forward end of said lever, said screw extending through said lever to engage said rear end of said bell.

16. A pipe joint retaining device as claimed in cClaim 15, further comprising a resilient O-ring gasket set in said bell and axially abutted to said ring when said holding screws are tightened while said lever is in said closed position, to effect a hermetic seal between said bell and said first pipe.

* * * * *